Dec. 12, 1933.  A. STUBER ET AL  1,939,238

AUTOMATIC SELF THREADING MOTION PICTURE APPARATUS

Filed March 12, 1930

Adolph Stuber & William A. Riddell
Inventors

Attorneys

Patented Dec. 12, 1933

1,939,238

UNITED STATES PATENT OFFICE 1,939,238

AUTOMATIC SELF-THREADING MOTION PICTURE APPARATUS

Adolph Stuber and William A. Riddell, Rochester, N. Y., assignors to Eastman Kodak Company, Rochester, N. Y., a corporation of New York Application March 12, 1930. Serial No. 435,125

10 Claims. (Cl. 88—17)

This invention relates to photography and more particularly to self-threading mechanism for motion picture apparatus. One object of my invention is to provide a self-threading machine in which the film is properly positioned, loops are properly formed and the film is directed to a take-up mechanism automatically by merely inserting one end of the film into a tunnel-like film guide. Another object of my invention is to provide a tunnel like film guide including a plurality of parts, some movably mounted and others fixably mounted and to provide a unitary operating mechanism for actuating the movable members in unison and other objects will appear from the following specification, the novel features being particularly pointed out in the claims at the end thereof.

Coming now to the drawing wherein like reference characters denote like parts throughout:

I have shown self-threading mechanism as being carried by a standard type of projector although, of course, a camera might be equipped in the same way. For details of certain parts of the self-threading mechanism, reference may be had to Patent Number 1,694,110, H. C. Wellman for Motion picture projector, issued December 4, 1928. This application is for an improvement over the mechanism shown in the Wellman patent.

Figure 1:
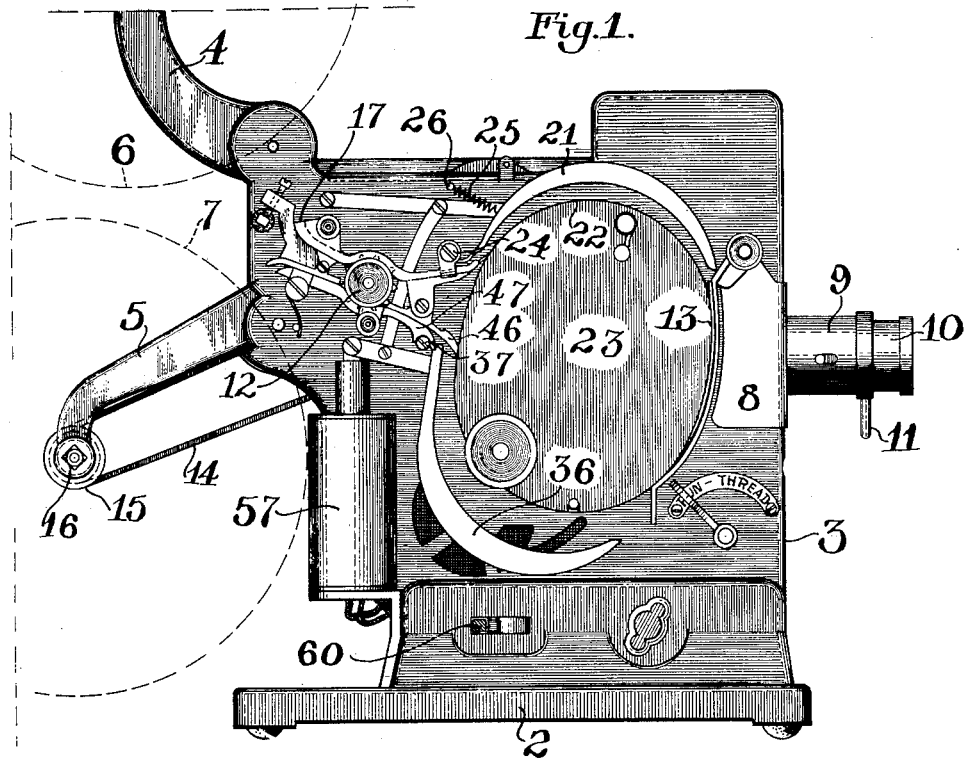
Fig. 1 is a side elevation of a motion picture machine having a self-threading mechanism constructed in accordance with and embodying a preferred form of my invention.

As indicated in Fig. 1, a projector may consist of a base 2 having an upstanding plate 3 which forms one side of a housing enclosing the gearing and other mechanism adapted to operate the pull-down mechanism and which all may be of any standard type.

On one side of the plate 3 there is pivotally mounted a pair of arms 4 and 5 having suitable trunnions to support a pair of film reels 6 and 7, reel 6 carrying a supply of film and reel 7 carrying the film which has passed through the projector.

On the front part of the plate 3 there is a mount 8 which carries a barrel in which a tube 10 is slidably mounted, this tube carrying the usual objective and being movable by means of a handle 11 to focus an image of a film lying in the gate on a screen.

As is usual with machines of this type, a toothed sprocket 12 is provided for moving the film to and from the film gate which may be broadly designated as 13. The sprocket 12 draws film from reel 6 and furnishes film to reel 7, reel 7 being driven by power through a belt 14, pulley 15 and shaft 16, the last mentioned member supporting and having driving connection with the reel 7. In order to thread film properly through the machine the Wellman patent discloses a series of film guiding members which are in most respects similar to the film guiding members which we have shown in the present application.

The film guiding means resembles a tunnel-like channel through which film is impelled by the sprocket 12. The width of the channel may be varied in places since portions of the channels are made up of pairs of plates, some fixedly mounted and some movably mounted.

Figure 4:
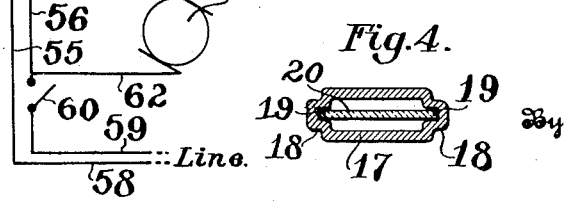
Fig. 4 is an enlarged cross section through the film guide 17.

Film drawn from reel 6 may be entered into the tubular member 17 and by it may be directed into contact with the teeth of the sprocket 12. The tubular member 17 is a tube which is oblong in cross section as, as shown in Fig. 4 in an enlarged cross section, this member is preferably provided with formed in edges 18, which support the edge portions 19 of a film 20 passing through the channel. In this way the delicate surface of the image bearing film area is not scratched or abraded.

Passing from the film sprocket 12, the film passes beneath a portion of a tunnel-like member formed by the movable film guiding member 21 and the edge 22 of the oval shaped housing 23. Member 21 is movably mounted upon a stud 24 which is carried by plate 3 and a spring 25 attached to member 21 and to a screw 26 on plate 3 which is adapted to hold the plate 21 spaced from part 22 as shown in Fig. 1.

Figure 3:
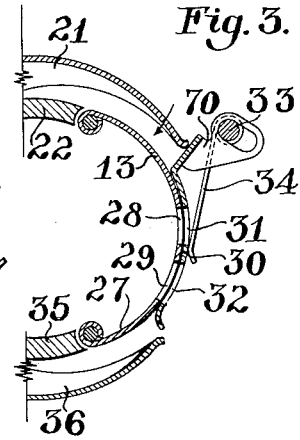
Fig. 3 is a fragmentary sectional view of parts of the tunnel-like film gate members removed from the camera.

From that portion of the tunnel-like film guideway formed by members 21 and 22 film passes through the gate 13 which, as best shown in Fig. 3, consists of an inner relatively fixed plate 27, apertured at 28 for the light beam and at 29 for the pull-down mechanism which forms one side of the gate and the hingedly mounted plate 30, apertured at 31 for the light beam and at 32 for the pull-down mechanism, forming the other side of the gate. Plate 30 is hingedly and slidably mounted upon a stud 33 and by a spring 34 for normally holding the gate in an operative position shown in Fig. 3 wherein a film is pressed between the plates 30 and 27 and is thus held in position for projection.

Figure 2:
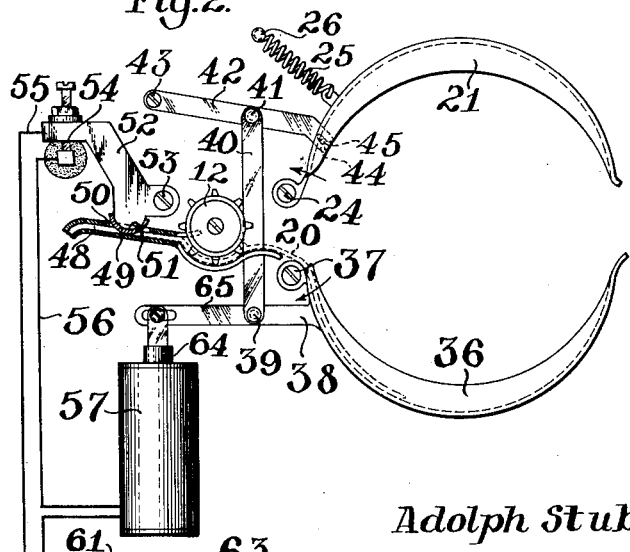
Fig. 2 is a side elevation of certain parts of the self-threading mechanism, together with a wiring diagram illustrating the circuit through which the mechanism is operated.

From the gate member 13 the film may pass between still another portion of the tunnel-like film guideway in which there is a relatively fixed member 35 and a relatively movable film guiding member 36, the latter being hingedly mounted upon a stud 37 so it can move from the position shown in Fig. 2 to the position shown in Fig. 1. The hinged member 36 carries an arm 38 to which is pivoted at 39 a link 40, this latter link being pivotally attached at 41 to an arm 42 pivoted at 43 to the plate 3 and having a fork-shaped end 44 engaging a pin 45 carried by the guide member 21.

As above mentioned guide member 21 is normally held in an operative or running position (as in Fig. 1) by means of a spring 25. This same spring is adapted to normally move the film guiding member 36 about its pivot 37 in an opposite direction to the direction of movement of film guide 21, that is, when the film guide 21 moves in the direction of the arrow, Fig. 2, links 42, 40 and arm 38 at its pivotal point 39 is thrust upwardly so that film guide 36 is swung in the direction of the arrow about the pivot 37.

From the film guide just described the film is directed by means of the curved plate 46 and the plate 47 facing the curved plate past the sprocket 12 and film moving from this sprocket is directed to the take-up reel 7 as is fully shown in Patent Number 1,645,882, A. Stuber, October 18, 1927.

As far as has been above described, our present mechanism is substantially the same as that shown in the patents above mentioned but with the patented structure an operator manually positions the various sections of the film guiding tunnel for threading, after threading stops his machine and positions the film guiding members for running and again starts the machine.

It is to do away with these operations that our present invention is particularly directed.

Since it is necessary to have the film guiding members in one position for running and in another position for threading, I change the position of the threading means automatically by means of the film in the following manner. Referring particularly to Fig. 2, when the film passes through that part of the film guiding tunnel formed by the movable member 36 and the fixed member 35, it passes beneath the film sprocket 12. After the spocket moves the film onwardly it goes into another portion of the tunnel-like film guide which includes a pair of relatively fixed spaced plates 48 and 49. These may be conveniently arranged with formed up edges as indicated for the film guide 17 in Fig. 4. Plate 48 is provided with an opening 50 through which a curved arm 51 passes, this arm being carried by a plate 52, pivoted at 53 to a support and carrying an adjustable contact member 54. This contact member forms a switch for making a circuit through wires 55 and 56, the latter leading to a solenoid 57 and the former being attached to one of the line wires 58. The other line wire 59, broken by a switch 60, leads to the other terminal of the solenoid and from wires 55 and 56, wires 61 and 62 lead to a motor 63 which furnishes the power for operating the sprocket 12 and the pull-down mechanism.

As indicated in Fig. 2, when the switch 60 is closed the motor 63 is set in motion and the solenoid 57 is energized. This causes the solenoid plunger 64 to draw downwardly upon the outer end 65 of the lever 38 and thus move the guiding members 21 and 36 to a threading position shown in Fig. 2 against the action of the spring 25.

In this position film may be entered into the channel 17 and manually moved until the film contacts with the sprocket 12. The sprocket will then impel the film through the channel members past the gate, back under the sprocket 12 and into the channel member composed of the plates 48 and 49 and when the end of the film 20 passes beneath the curved arm 51, this arm will be moved so as to break the circuit through the contact member 54. This, of course, will permit the solenoid 57 to release its plunger 64 and permit the spring 25 to move the film guiding members to the position shown in Fig. 1 in which the guides 21 and 36 are opened and the gate 13 is closed.

Any desired arrangement may be provided at the gate 13 for opening the movable gate member 30 through one or both of the film guiding members 21 or 36.

The patent above mentioned, 1,694,110 shows such a gate operated through contact with both of the film guiding members and Fig. 3 shows a modification of this idea in which only the upper film guiding member 21 contacts with the cam surface 70 of the film guide 30 to move it to and from its operative position. With the mechanism above described it will be seen that an operator in threading the machine does not have to manually adjust the parts after once entering the film into the guide member 17. This greatly facilitates the threading movement and insures the film being in its proper position before the guide members are moved from their threading position to the position in which the film runs through the camera.

Having thus described our invention, what we claim as new and desire to secure by Letters Patent is:

1. In motion picture apparatus, means for guiding a film through said apparatus including a frame, a series of guide members movably carried on the frame and with the frame forming substantially continuous channels through which film may pass, said guides being movable to and from a film guiding position, power means for moving all of the movable film guides, mechanism for restraining such movement, said means being under the control of a film passing through said guideway.

2. In a motion picture apparatus, a tunnel-like film guideway, said guideway comprising a plurality of relatively movable and relatively fixed plates adapted to form channels through which a film may pass, said movable plates being interconnected to move together, said connections being arranged to move the plates to enlarge portions of the guideway and bring together other portions of the guideway when the connections are moved in one direction, and to reverse this movement when the connections are moved in an opposite direction, a solenoid for moving said plates in one direction and a circuit for the solenoid controlled by the film.

3. In a motion picture apparatus, a tunnel-like film guideway, said guideway comprising a plurality of relatively movable and relatively fixed plates adapted to form channels through which a film may pass, said movable plates being interconnected to move together, said connections being arranged to move the plates to enlarge portions of the guideway and bring together other portions of the guideway when the connections are moved in one direction, and to reverse this movement when the connections are moved in an opposite direction, two power operated mechanisms, one for moving said connections in one direction and the other for reversing said movement.

4. In a motion picture apparatus, a tunnel-like film guideway, said guideway comprising a plurality of relatively movable and relatively fixed plates adapted to form channels through which a film may pass, said movable plates being interconnected to move together, said connections being arranged to move the plates to enlarge portions of the guideway and bring together other portions of the guideway when the connections are moved in one direction, and to reverse this movement when the connections are moved in an opposite direction, and a power operated mechanism for moving said plates in one direction, a control member, said power operated mechanism being adapted to be actuated by the control member, said control member being movable through the passage of film through said tunnel-like guideway.

5. In a motion picture apparatus, a frame, a plurality of substantially continuous film guiding members forming a tunnel through which film may pass, movable mounts for certain film guiding members on which said members may move to vary the width of the passageway through the tunnel in places, a portion of said tunnel walls being fixedly spaced one from the other, a member associated with the movable film guiding members and with a member projecting into the path of the film between the fixedly spaced tunnel walls, power operated means connected to the movable guide members, and means for controlling the power operated means through said member projecting into the path of the film.

6. In a motion picture apparatus, a frame, a plurality of substantially continuous film guiding members forming a tunnel through which film may pass, movable mounts for certain film guiding members on which said members may move to vary the width of the passageway through the tunnel in places, a portion of said tunnel walls being fixedly spaced one from the other, a member associated with the movable film guiding members and with a member projecting into the path of the film between the fixedly spaced tunnel walls, power operated mechanisms connected to the movable guide members and adapted to operate the movable guide members in two directions, said member projecting into the path of the film constituting a control member for the mechanisms.

7. In motion picture apparatus, means for guiding a film through said machine including a frame, a plurality of guide members some fixedly mounted and others movably mounted with respect to the frame, said guide members being adapted to form a tunnel-like substantially continuous film channel through the machine, connections between said movably mounted guide members, an electrical power operated device for moving said connections, an electric circuit, and a switch, said switch being under the control of a film passing through said guideway.

8. In motion picture apparatus, means for guiding a film through said machine including a frame, a plurality of guide members some fixedly mounted and others movably mounted with respect to the frame, said guide members being adapted to form a tunnel-like substantially continuous film channel through the machine, connections between said movably mounted guide members, an electrical power operated device for moving said connections, an electric circuit, and a switch, a switch operating arm projecting into said tunnel-like film guideway and adapted to be operated by film passing therethrough.

9. In motion picture apparatus, means for guiding a film through said machine including a frame, a plurality of guide members some fixedly mounted and others movably mounted with respect to the frame, said guide members being adapted to form a tunnel-like substantially continuous film channel through the machine, connections between said movably mounted guide members, an electrical power operated device for moving said connections, an electric circuit, and a switch, a switch operating arm projecting into said tunnel-like film guideway and adapted to be operated by film passing therethrough, and a spring connected to said movably mounted guide members adapted to move said members when said switch breaks said electric circuit to said electrical power operated device.

10. In a motion picture apparatus, a frame, a plurality of substantially continuous film guiding members forming a tunnel through which film may pass, movable mounts for certain of the film guiding members permitting the guides to move between two positions for varying the width of the tunnel, at least two of the facing tunnel walls being fixedly mounted with respect to each other forming a relatively narrow tunnel portion through which film may pass, a member projecting into the narrow tunnel portion adapted to be engaged by the film, means under control of said member including a solenoid and a suitable circuit and connected to certain of said movably mounted guide members adapted to move the movable guide members toward one position, and means including a spring acting against said solenoid means adapted to move said movably mounted guide members toward the other position, the strength of said spring being insufficient to overcome the solenoid when the latter is energized.

ADOLPH STUBER.
WILLIAM A. RIDDELL.